US005183507A

United States Patent [19]

Scherer

[11] Patent Number: 5,183,507

[45] Date of Patent: Feb. 2, 1993

[54] PARTICULATE MATERIAL DISPENSING DEVICE

[76] Inventor: Welby J. Scherer, P.O. Box 3875, Champaign, Ill. 61826

[21] Appl. No.: 602,965

[22] Filed: Oct. 25, 1990

[51] Int. Cl.[5] .......... B05C 19/06

[52] U.S. Cl. .......... 118/18; 118/25; 118/120; 118/308; 118/504; 222/275; 222/305; 222/345; 222/361

[58] Field of Search .......... 118/13, 18, 25, 24, 118/120, 308, 504; 222/361, 275, 349, 345, 265, 276, 334, 305

[56] References Cited

U.S. PATENT DOCUMENTS

| | | | |
|---|---|---|---|
| 1,769,633 | 6/1930 | Weber et al. | 118/13 |
| 2,002,018 | 5/1935 | Martoccio . | |
| 2,191,268 | 2/1940 | Zeun | 118/18 |
| 2,369,251 | 2/1945 | Reynold | 222/361 |
| 2,865,766 | 12/1958 | Christianson . | |
| 3,272,396 | 9/1966 | Neville, Jr. | 222/276 |
| 3,276,637 | 10/1966 | Fender | 222/345 |
| 3,330,311 | 4/1967 | Christine et al. | 222/361 |
| 3,760,989 | 9/1973 | Morine et al. | 222/276 |
| 4,537,121 | 8/1985 | Bero et al. . | |
| 4,629,093 | 12/1986 | LeMolaire | 222/361 X |
| 4,715,275 | 12/1987 | Getman . | |
| 4,733,803 | 3/1988 | Sisson et al. | 222/276 |
| 4,925,689 | 5/1990 | Getman . | |

FOREIGN PATENT DOCUMENTS

| | | | |
|---|---|---|---|
| 2204856 | 11/1988 | United Kingdom | 222/305 |

*Primary Examiner*—W. Gary Jones
*Assistant Examiner*—Todd J. Burns
*Attorney, Agent, or Firm*—Staas & Halsey

[57] ABSTRACT

A dispensing device for automatically dispensing measured amounts of particulate material which includes supply means for supplying a quantity of the particulate material and a chute for receiving the particulate material from the supply means. A reciprocating pusher means is positioned in the chute for controlling the amount of particulate material dispensed from the supply means and for discharging the dispense particulate material from the chute. A distribution hopper receives the particulate material from the chute and discharges it to a reciprocating measuring plate having a plurality of removable measuring inserts therein whereby the particulate material is received in cavities in the inserts. As the measuring plate is moved forwardly, the particulate material passes through a control plate having a plurality of slots therein and is deposited in a plurality of mask hoppers for ultimate dispensing. When the dispensing device is used in combination with a conveyor means carrying articles to be coated with the particulate material, the particulate material is then dispensed from the mask hoppers onto the articles to be coated. A vertically movable plate may be utilized for pressing the particulate material into the articles.

14 Claims, 2 Drawing Sheets

16 14 12 21 10 18 20 38 40 48 28 36 58 22 44 42 26 24 46 56 52 A 54

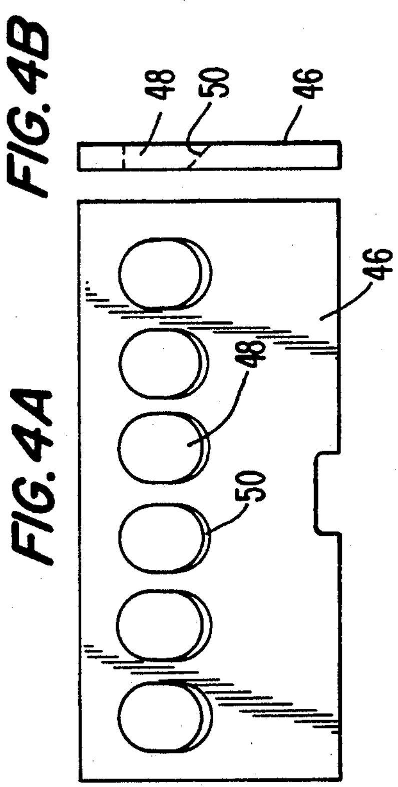
FIG. 4B
48
50
46
FIG. 4A
46
48
50
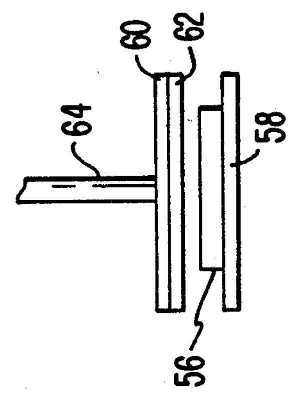
FIG. 5
64
60
62
58
56
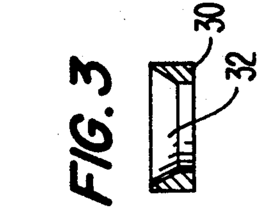
FIG. 3
30
32
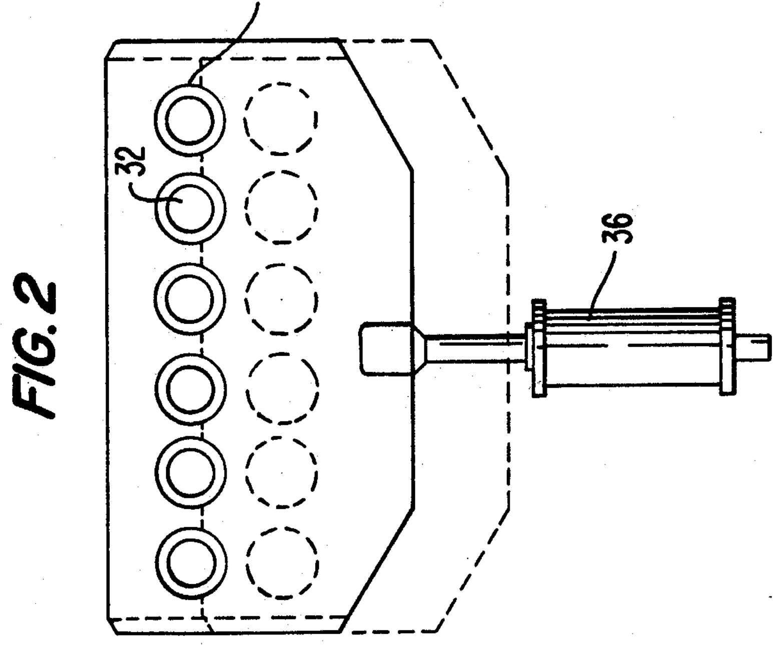
FIG. 2
28
32
36

PARTICULATE MATERIAL DISPENSING DEVICE

BACKGROUND OF THE INVENTION

1. Field of the Invention

The present invention relates to an improved dispensing device for dispensing measured amounts of particulate material, and more particularly, to such a dispensing device which is adapted to dispense measured amounts of particulate material such as nuts onto edible food products such as ice cream bars.

2. Description of the Related Art

Many types of dispensing devices have heretofore been known for dispensing particulate material. In the food processing industry in particular, such dispensing devices are used to dispense particulate material onto edible food products such as ice cream bars, candy bars and other confectionery products. Many of such heretofore known dispensing devices, however, are complicated in design and are difficult to control in terms of dispensing the specific measured amount of particulate material such as nuts on an edible food product without wasting any significant amount of the particulate material. Specifically, such prior art dispensing devices have not been as reliable as desired when the dispensing devices are used in combination with conveyor means conveying a plurality of articles to be coated.

SUMMARY OF THE INVENTION

It is an object of the present invention to provide a dispensing device for automatically dispensing measured amounts of particulate material.

It is another object of the present invention to provide a dispensing device for automatically dispensing measured amounts of particulate material onto a product to be coated in an efficient and waste saving manner.

It is a further object of the present invention to provide a dispensing device for automatically dispensing measured amounts of particulate material onto a plurality of edible food products as the products are moving along a conveyor assembly line.

It is still another object of the present invention to provide a dispensing device for automatically dispensing measured amounts of particulate material which is reliable and accurate in operation.

The present invention achieves the above and other objects by providing a dispensing device for automatically dispensing measured amounts of particulate material which includes supply means such as a hopper for supplying a quantity of particulate material to a receiving chute. A reciprocating pusher means is mounted in the chute for controlling the amount of particulate material dispensed from the supply means and for discharging the particulate material into a distribution hopper. A reciprocating measuring plate having a plurality of openings therein is provided for receiving the particulate material from the distribution hopper. Each measuring plate opening has a removable measuring insert mounted therein. Each insert has a cavity of a specified size for receiving a measured amount of particulate material therein. The measuring inserts are removable and interchangeable whereby inserts having different sized cavities may be used to vary the quantity of particulate material received therein. A control plate having a plurality of slots therein is provided whereby the particulate material in the cavities of the measuring inserts passes through the slots when the measuring plate is moved forwardly. A plurality of mask hoppers are provided for receiving and subsequently dispensing the particulate material which passes through the control plate slots. Each of the mask hoppers may be provided with a removable mask having an opening therein whereby masks having different sized openings may be used. Air cylinders of adjustable speed and stroke are provided for reciprocating the pusher means and the measuring plate. The device also may include means for vibrating the measuring plate to facilitate filling the cavities in the inserts in the plate with the particulate material.

The dispensing device of the present invention is particularly adapted to operate in combination with conveyor means for conveying articles such as edible food products to be coated with the particulate material. The dispensing device also may include a vertically movable plate for pressing the particulate material into the articles on the conveyor means after the articles have been coated with the particulate material.

These, together with other objects and advantages, which will be subsequently apparent, reside in the details of construction and operation as more fully hereinafter described and claimed, reference being made to the accompanying drawings forming a part hereof, wherein like numerals refer to like parts throughout.

BRIEF DESCRIPTION OF THE DRAWINGS

FIG. 2 is a top plan view of a measuring plate of the present invention operated by an air cylinder and having dotted lines to indicate reciprocating movement of the measuring plate;

FIG. 3 is an enlarged sectional side view of an insert which fits into an opening in the measuring plate;

FIGS. 4A and 4B are a top plan view and a side view, respectively, of a control plate of the present invention; and FIG. 5 is a side view illustrating a vertically movable plate for pressing particulate material into an article positioned on a conveyor means.

DESCRIPTION OF THE PREFERRED EMBODIMENTS

Figure 1:
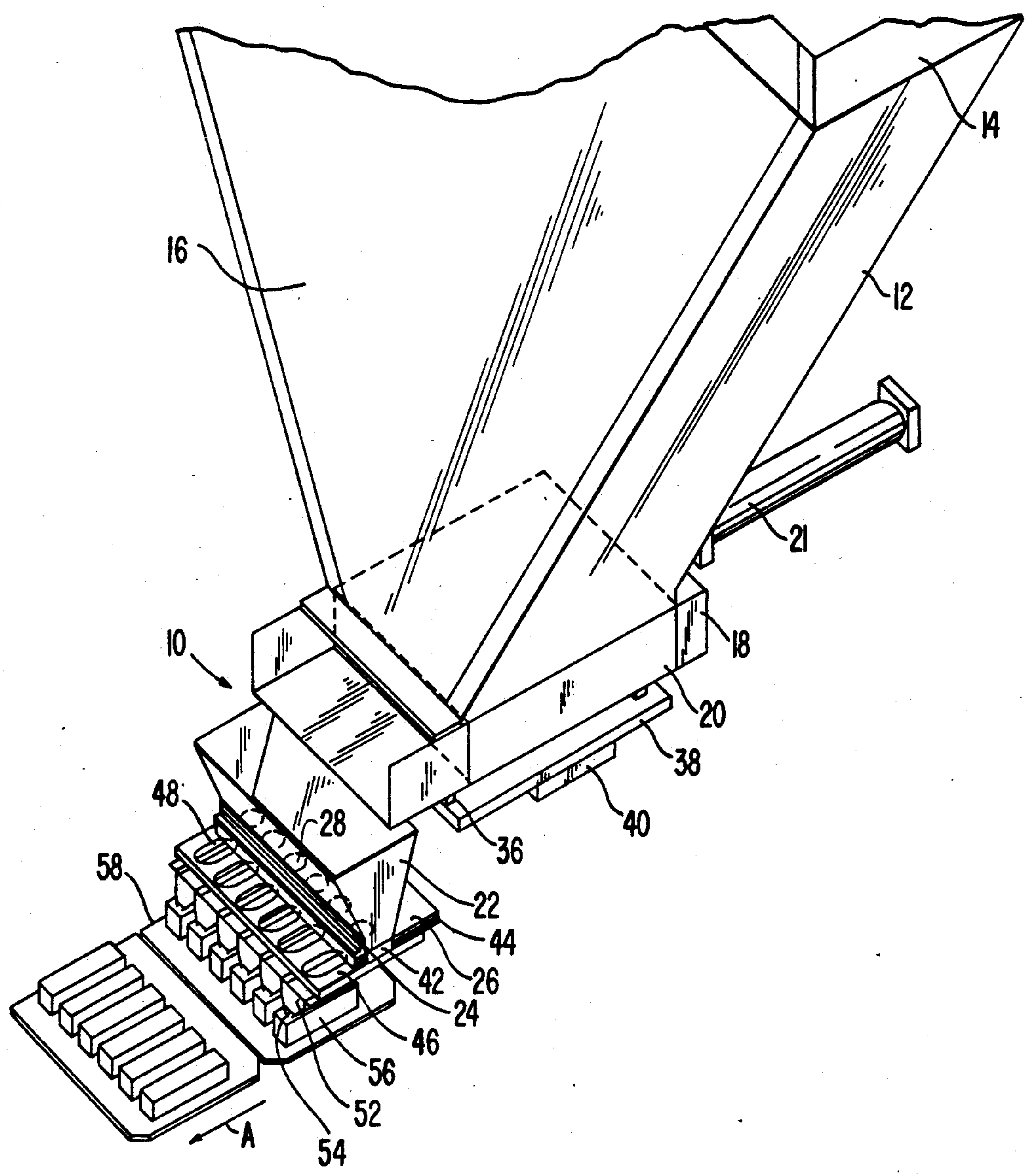
FIG. 1 is a perspective view, partially broken away, showing the dispensing device of the present invention used in combination with a conveyor means conveying articles to be coated with particulate material.

Referring to the drawings, shown in FIG. 1 is a dispensing device, generally indicated by the numeral 10, for automatically dispensing measured amounts of particulate material. While the dispensing device of the present invention is primarily designed to dispense edible products such as nuts onto another edible product, such as an ice cream bar, it may be employed in any industry wherein it is desired to dispense measured amounts of particulate material.

The dispensing device 10 include supply means, such as receiving hopper 12, for supplying a quantity of particulate material. Hopper 12 is provided with a suitable closing means on the top such as lid 14 which may be opened and closed by any suitable means such as an air cylinder (not shown). The side panels and the back panel of the hopper 12 slope downwardly and inwardly to insure that the particulate material easily flows to the bottom thereof. The hopper is also provided with a front panel 16 which also slopes downwardly and forwardly from the top thereof. Front panel 16 preferably is constructed of a clear, hard, practically unbreakable polycarbonate resin material such as Lexan. By constructing front panel 16 of a clear material, the quantity of particulate material in the hopper can be readily visually ascertained. Any suitable means such as an elevator system, a screw system or a pneumatic system may be used to supply particulate material to the receiving hopper 12.

Attached to the bottom of receiving hopper 12 is a chute or trough 18 having a reciprocating pusher means such as block 20 therein. Preferably block 20 is constructed of a nylon material whereby it may easily reciprocate back and forth in the chute 18. An air cylinder 21 or other suitable means such as a hydraulic cylinder is attached to the back end of the block 18 to reciprocate the block back and forth in the chute. Preferably the cylinder 21 has an adjustable stroke and an adjustable speed. Disposed below the front end of the chute 18 is a distribution hopper 22 for receiving particulate material discharged from the end of the chute. Both the front panel and the back panel of the distribution hopper 22 slant downwardly and inwardly to ensure that the particulate material easily moves to the bottom of the hopper. A scraper plate 24 is mounted to the front of the distribution hopper for a purpose to be described more fully hereafter.

A reciprocating measuring plate 26 having a plurality of holes or openings 28 therein is provided just below the distribution hopper. As shown in FIGS. 2 and 3, each measuring plate opening 28 has a removable and interchangeable insert 30 mounted therein. Each measuring insert 30 is provided with a cavity 32 therein for receiving particulate material discharged from the distribution hopper. By making the inserts 30 removable and interchangeable, inserts having different sized cavities therein may be utilized when it is desired to vary the amount of particulate material being dispensed.

As shown in FIG. 2, attached to the back of the measuring plate 26 is an air cylinder 36 of adjustable stroke and speed for reciprocating the measuring plate. Any other suitable means such as a hydraulic cylinder also may be used to reciprocate measuring plate 26. If desired, the air cylinder 36 may be mounted on a vibrating platform 38 having suitable vibrating means 40 attached thereto such as an electrically powered mechanical vibrator. The vibrating platform transmits the vibrations through air cylinder 36 to also cause the measuring plate 28 to vibrate. This vibration helps insure that the particulate material is shaken into the measuring cavities 32. While the dispensing device of the present invention will operate satisfactorily without the vibrating means, the use of the vibrating means facilitates operation of the device.

Provided at the bottom of each side panel of the distribution hopper 22 is an extension 42 which goes over the top and down the side of the measuring plate to fit into a groove 44 in the side of the measuring plate. This helps insure that the there is no spillage of the particulate material and also provides a guide for the forward and backward movement of the measuring plate. Moreover, this construction allows for removal of these parts without the necessity of any tools so that the parts may be readily cleaned.

Disposed below the measuring plate 26 is a control plate 46 having a plurality of slots 48 therein for receiving the particulate material from the cavities of the inserts in the measuring plate when the measuring plate is forwardly. When the measuring plate is in its most backward position as shown in FIG. 1, the bottoms of the cavities 32 in the inserts 30 are closed by the back side of the control plate 46. When the measuring plate 26 is moved forwardly as shown in the solid line position of FIG. 2, the particulate material is discharged from the cavities into the slots 48. The number of slots corresponds to the number of openings 28 and inserts 30 in the measuring plate. As shown most clearly in FIGS. 4A and 4B, the back end of each slot 48 may slant downwardly and forwardly whereby the particulate material starts to fall in the slot as soon as an edge of one of the cavities in the inserts in the measuring plate coincides with the top edge of the slot. This insures an even distribution of the particulate material beginning at the back of the slot. The measuring plate is pushed forwardly with sufficient speed to throw the particulate material across the length of each slot thereof.

Mounted below the slots 48 in the control plate 46 are a plurality of mask hoppers 52 corresponding in number to the number of slots 48 in the control plate to receive the particulate material that passes through the slots. Each mask hopper 52 may be provided with a removable mask 54 at the bottom thereof. Each mask is provided with an opening to control the manner in which the particulate material is subsequently dispensed from the mask hopper 52. By making the mask removable or interchangeable, masks having different sized openings therein may be utilized depending on the end result desired.

While the dispensing machine thus far described is a complete machine which may be utilized to dispense measured amounts of a particulate material for a desired end result, the dispensing device is particularly adapted to operate in combination with a conveyor means 58 having articles 56 thereon to be coated with the particulate material. The number of articles 56 on the conveying means 58 correspond to the number of mask hoppers.

As noted above, the measuring plate 26 is moved forwardly with sufficient speed to evenly distribute the particulate material across the length of each slot 48 in the control plate 46 and this correspondingly insures that the particulate material is also evenly distributed along the length of each mask hopper to achieve an even coating on the article to be coated. By providing removable masks in the mask hoppers, masks having openings of the same general configuration as the articles to be coated may be employed. While the dispensing device of the present invention is particularly well adapted for coating nuts onto ice cream bars, it also may be used in connection with coating other edible food products.

When used in combination with a conveying means 58, suitable controls are provided for the dispensing device whereby dispensing is timed in accordance with the movement of the articles on the conveying means so that the material is dispensed only when the articles are properly positioned under the mask hoppers. As indicated in FIG. 1, the conveyor means is adapted to move forwardly in the direction of arrow A.

When used in combination with a conveying means carrying articles to be coated, the dispensing device of applicant's invention further may include a vertically movable plate 60 at the end thereof, as shown in FIG. 5, which may have a sponge type or other similar facing 62 or just a flat surface to touch the articles being coated lightly and depress the particulate material into the articles. The facing, if used, may be removable for cleaning. Any suitable means such as an air cylinder 64 may be provided for moving the plate 60 upwardly and downwardly. Suitable control means are provided for controlling the operation of the auxiliary plate whereby the operation of the plate may be indexed to the movement of the conveying system and only operated downwardly when the articles on the conveyor are underneath the plate.

In operation of the dispensing device according to the present invention, the receiving hopper 12 initially is filled with particulate material to be dispensed and then the pusher block 20 is moved rearwardly a short distance to permit specified amount of the particulate material to fall into the chute 18. The block 20 is then moved forwardly to cut off the supply and move material from the receiving hopper forwardly in the chute. After two or three openings, enough particulate material is on the end of the chute whereby as each successive quantity of particulate material is dispensed from the receiving hopper the pusher block forces the material to the edge whereupon the approximate specified quantity falls into the distribution hopper 22. From the distribution hopper, the particulate material flows by gravity to the measuring plate 26 whereupon it is received in the cavities 32 of the inserts 30 in the measuring plate. The measuring plate is then moved forwardly whereupon the particulate material is discharged from the cavities 32 through the slots 48 in the control plate 46 into the mask hoppers 52. In the case where the dispensing device 10 is used in combination with a conveying means 58 to coat articles 56, the particulate material drops through the masks of the masking hoppers onto the article to be coated. If desired, the vertically movable plate 60 is then activated downwardly to pres the materials into the articles. Accordingly, the present invention provides a dispensing device for automatically dispensing measured amounts of particulate material in a reliable and functional manner.

Numerous alterations and modifications of the structure herein disclosed will suggest themselves to those skilled in the art. It is to be understood, however, that the present disclosure relates to the preferred embodiments of the invention which is for the purposes of illustration only and is not to be construed as a limitation of the invention. All such modifications which do not depart from the spirit of the invention are intended to be included within the scope of the appended claims.

I claim:

1. A dispensing device for automatically dispensing measured amounts of particulate material comprising:
- supply means for supplying a quantity of particulate material;
- a chute for receiving said particulate material from said supply means;
- automatic reciprocating pusher means in said chute for controlling the amount of said particulate material dispensed from said supply means and for discharging said dispensed particulate material from said chute;
- a distribution hopper for receiving said particulate material from said chute;
- a reciprocating measuring plate having a plurality of openings therein for receiving said particulate material in said openings from said distribution hopper; and
- a plurality of mask hoppers for receiving said particulate material from said measuring plate openings and subsequently dispensing said particulate material.

2. A dispensing device as recited in claim 1 which further includes a control plate having a plurality of slots therein; said control plate being positioned between said measuring plate and said mask hoppers with said slots positioned over said mask hoppers.

3. A dispensing device as recited in claim 1, wherein a measuring insert having a cavity therein is mounted in each of said measuring plate openings for receiving said particulate material.

4. A dispensing device as recited in claim 3, wherein each of said measuring inserts is removable and interchangeable, whereby inserts having different sized cavities may be used to vary the quantity of particulate material received by said masking hoppers.

5. A dispensing device as recited in claim 1, wherein each of said mask hoppers is provided with a mask having an opening therein, said mask being removable and interchangeable whereby masks having different sized openings may be used.

6. A dispensing device as recited in claim 1 which further includes a scraper plate on the front of said distribution hopper to scrape off any excess particulate material on said measuring plate as said measuring plate is moved forwardly.

7. A dispensing device as recited in claim 1 which further includes means for vibrating said measuring plate.

8. A dispensing device as recited in claim 1 which further includes air cylinders of adjustable speed and stroke for reciprocating said pusher means and said measuring plate.

9. A dispensing device as recited in claim 1, wherein said measuring plate has a groove along each side thereof and said distribution hopper is provided with an extension at the bottom of each side end thereof which is slidably engaged with one of said grooves.

10. A dispensing device as recited in claim 1 which is adapted to operate in combination with conveyor means for conveying articles to be coated with said particulate material and wherein said dispensing device further includes a vertically movable plate for pressing said particulate material into said articles on said conveyor means after said articles have been coated with said particulate material.

11. A dispensing device as recited in claim 10, wherein said plate is provided with a facing of soft material.

12. A dispensing device for automatically dispensing measured amounts of particulate material comprising:
- supply means for supplying a quantity of particulate material;
- a chute for receiving said particulate material from said supply means;
- automatic reciprocating pusher means in said chute for controlling the amount of said particulate material dispensed from said supply means and for discharging said dispensed particulate material from said chute;
- a distribution hopper for receiving said particulate material from said chute;
- a reciprocating measuring plate having a plurality of openings therein;
- a removable measuring insert having a cavity therein mounted in each of said measuring plate openings for receiving said particulate material from said distribution hopper;

a control plate having a plurality of slots therein through which said particulate material passes when said measuring plate is moved forwardly; and a plurality of mask hoppers for receiving and subsequently dispensing said particulate material which passes through said control plate slots.

13. A dispensing device as recited in claim 12, wherein each of said mask hoppers is provided with a removable mask.

14. A dispensing device as recited in claim 12 which is adapted to operate in combination with conveyor means for conveying articles to be coated with said particulate material and wherein said dispensing device further includes a vertically movable plate for pressing said particulate material into said articles on said conveyor means after said articles have been coated with said particulate material.

* * * * *